July 30, 1940.  F. J. KAVANAUGH  2,209,568
SHUTTER CONTROL FOR BLINDS
Filed Oct. 23, 1939
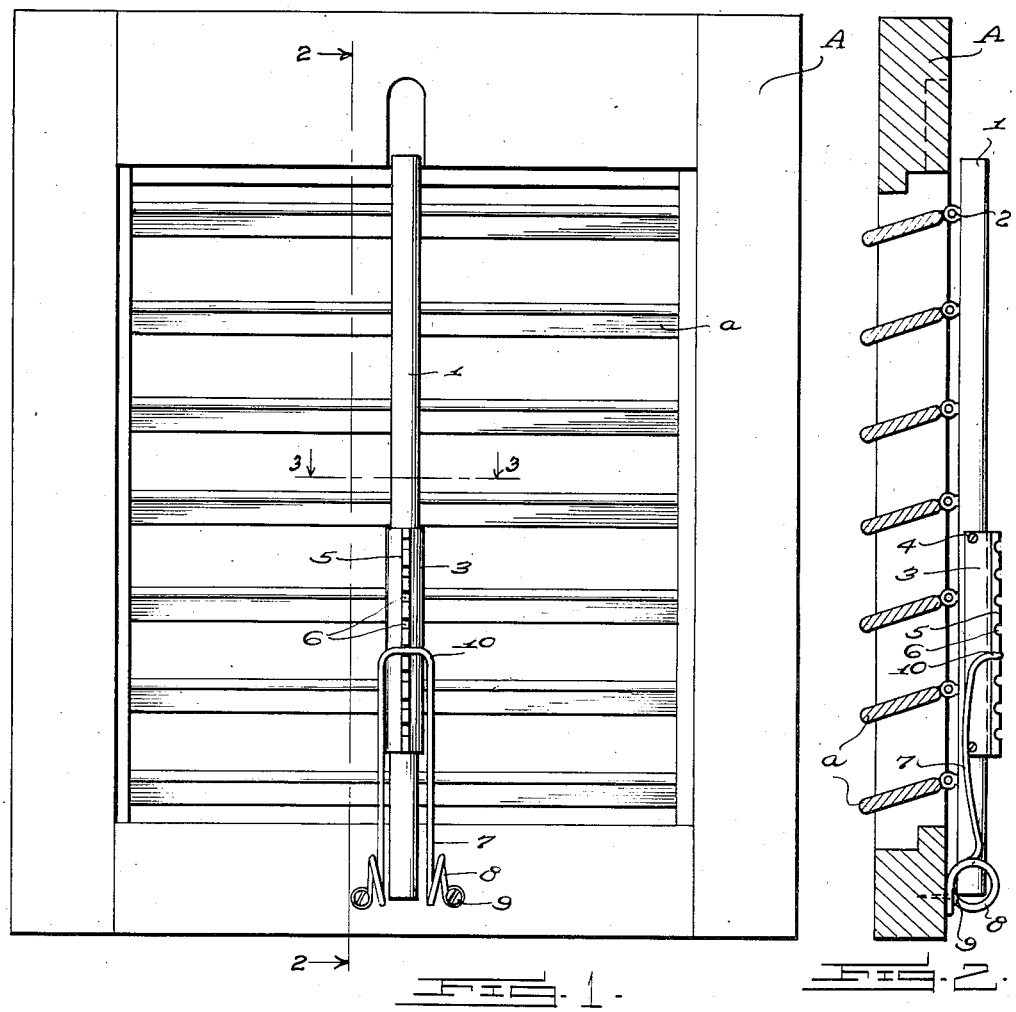
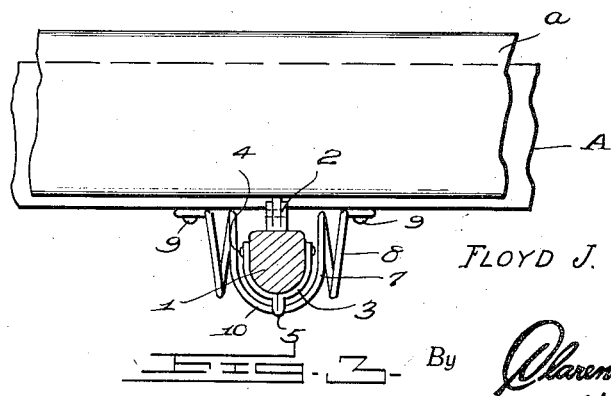
Inventor
FLOYD J. KAVANAUGH,
By Clarence A. O'Brien
and Hyman Berman
Attorneys Patented July 30, 1940

2,209,568

UNITED STATES PATENT OFFICE 2,209,568

SHUTTER CONTROL FOR BLINDS

Floyd J. Kavanaugh, Galveston, Tex.

Application October 23, 1939, Serial No. 300,829

1 Claim. (Cl. 292—345)

This invention relates to latch means for the shutters of blinds, the general object of the invention being to provide simple means for holding the shutters in any desired position from fully closed position to fully open position and in a positive manner so that there is no danger of the shutters being loosened or moved out of adjusted position by wind or other elements.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a front view of a blind assembly provided with the invention.

Figure 2 is a section on the line 2—2 of Figure 1.

Figure 3 is a section on the line 3—3 of Figure 1.

In these views the letter A indicates the frame of the blind and the letter $a$ indicates the pivoted shutters in the frame, these shutters being adjusted from fully closed position to open position by means of a vertically arranged rod 1 pivotally connected to edges of the shutters as shown at 2 so that by moving the rod vertically the shutters can be swung on the pivots to open or closed position or to any intermediate position.

In carrying out my invention I provide an elongated member 3 of substantially U-shape in cross section or having its hollow part of a shape to snugly receive a portion of the rod 1, the member being shown at 3 and is fastened to a part of the rod by screws or other fastening means 4. The bight of the member is formed with a rib 5 and this rib is provided with the spaced notches 6. A substantially U-shaped spring member 7 has coils 8 formed at the ends of its limbs and the free ends of these coils are fastened to the lower part of the frame A by screws 9 or the like and the bight 10 of the U-shaped member is offset forwardly and curved so as to pass over the rib of the member 3 and through a notch 6.

Thus by swinging the member 7 outwardly the bar 1 can be moved vertically to adjust the shutters $a$ to the desired position and, of course, this movement of the bar carries the member 3 with it. Then by releasing the spring member 7 the bight 10 will engage one of the notches 6 and thus the parts will be held in the position to which they have been adjusted and there is no danger of the shutters being moved out of this position by the wind or other elements.

By means of this device the shutters can be easily adjusted without loosening or unfastening any fittings and at all times remain freely movable but yet is controlled and held in each desired position when so adjusted so that light and ventilation can be absolutely controlled regardless of wind or other elements.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

Latch means for the control bar of blind shutters comprising a U-shaped member fastened to a part of the control bar and having the central portion of its bight pressed into a closed loop to form a rib, said rib having spaced notches therein, an inverted U-shaped spring member having end portions of its limbs bent to form coils and the terminals of said limbs bent to form eyes, screws passing through the eyes into a part of the frame of the blind, with said spring member extending upwardly with its limbs alongside of the control bar and said limbs at their upper ends curving upwardly and outwardly to place the bight across the rib to engage one of the notches in the rib.

FLOYD J. KAVANAUGH.